US009148343B2

(12) United States Patent
Shah et al.

(10) Patent No.: US 9,148,343 B2
(45) Date of Patent: Sep. 29, 2015

(54) METHODS AND APPARATUS FOR IMPROVING COMPATIBILITY BETWEEN NETWORK DEVICES

(75) Inventors: Sandip Shah, Milpitas, CA (US); Surinder Singh, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 720 days.

(21) Appl. No.: 13/431,128

(22) Filed: Mar. 27, 2012

(65) Prior Publication Data

US 2013/0262651 A1 Oct. 3, 2013

(51) Int. Cl.
H04L 12/24 (2006.01)
G06F 9/445 (2006.01)
G06F 9/44 (2006.01)

(52) U.S. Cl.
CPC .............. *H04L 41/0866* (2013.01); *G06F 8/63* (2013.01); *G06F 8/65* (2013.01); *G06F 8/68* (2013.01)

(58) Field of Classification Search
CPC ............... G06F 8/63; G06F 8/65; G06F 8/68; H04L 41/0866
USPC .......................................................... 709/224
See application file for complete search history.

(56) References Cited

U.S. PATENT DOCUMENTS

| 5,579,509 | A | 11/1996 | Furtney et al. |
| 7,506,336 | B1 | 3/2009 | Ninan |
| 7,519,731 | B1 | 4/2009 | Enns |
| 7,765,194 | B1 | 7/2010 | Sharma et al. |
| 2003/0217133 | A1 | 11/2003 | Ostrup et al. |
| 2009/0187970 | A1* | 7/2009 | Mower et al. ...................... 726/3 |
| 2010/0146497 | A1* | 6/2010 | Kogan et al. ................... 717/170 |
| 2010/0211942 | A1* | 8/2010 | Deverakonda Venkata et al. ............................... 717/173 |
| 2011/0131293 | A1 | 6/2011 | Mori |
| 2011/0238805 | A1 | 9/2011 | Signori |
| 2012/0131216 | A1* | 5/2012 | Jain et al. ...................... 709/230 |

FOREIGN PATENT DOCUMENTS

WO 03048994 A2 6/2003
WO WO 03/048994 A2 6/2003

OTHER PUBLICATIONS

European Search Report mailed Nov. 13, 2014 for European Application No. EP13161005.7.
Extended Search Report, dated Nov. 13, 2014, for EP Application No. 13161005.7.

* cited by examiner

*Primary Examiner* — Brian J Gillis
*Assistant Examiner* — Michael A Keller
(74) *Attorney, Agent, or Firm* — Cooley LLP (57) ABSTRACT

In some embodiments, an apparatus includes a network device configured to receive an anomaly database of a first image that stores a set of differences between the first image and a base image. The network device is configured to compare the anomaly database of the first image with an anomaly database of a second image storing a set of differences between the second image and the base image to determine if the first and second images include at least one incompatible critical feature or incompatible non-critical feature. The network device is configured to send a signal associated with a first action if the first and second images include the at least one incompatible critical feature. The network device is configured to send a signal associated with a second action different from the first action if the first and second images include the at least one incompatible non-critical feature.

20 Claims, 4 Drawing Sheets

| Anomaly Database 410 | |
|---|---|
| Image Version Identifier 411 | 1.0 |
| IPv4 412 | Y |
| IPv6 413 | N |
| PoE 414 | N |
| Firewall Filter 415 | Y |
| PIM 416 | N |

| Anomaly Database 420 | |
|---|---|
| Image Version Identifier 421 | 4.0 |
| IPv4 422 | BP |
| IPv6 423 | NP |
| PoE 424 | TP |
| Firewall Filter 425 | FP |
| PIM 426 | TP |

| Anomaly Database 430 | |
|---|---|
| Image Version Identifier 431 | 1.5 |
| IPv4 432 | FP |
| IPv6 433 | TP |
| PoE 434 | TP |
| Firewall Filter 435 | FP |
| PIM 436 | NP |

```
Receive, at a first network device, a first image
configured to be installed at the first network
device, the first image including a first anomaly
database storing a set of differences between
the first image and a base image.
502
```

```
Access a second anomaly database storing a
set of differences between a second image
stored on a second network device and the
base image.
504
```

```
Compare the first anomaly database with the
second anomaly database to determine (1) if
the first image and the second image include at
least one incompatible critical feature and (2) if
the first image and the second image include at
least one incompatible non-critical feature.
506
```

```
Send a signal associated with a first action if
the first image and the second image include
the at least one incompatible critical feature.
508
```

```
Send a signal associated with a second action
different from the first action if the first image
and the second image include the at least one
incompatible non-critical feature.
510
```

FIG. 5

METHODS AND APPARATUS FOR IMPROVING COMPATIBILITY BETWEEN NETWORK DEVICES

BACKGROUND

Some embodiments described herein relate generally to compatibility between network devices, and, in particular, to methods and apparatus for validating and improving image compatibility for multiple network devices in a network.

In some known networks that include multiple network devices running different images, image compatibility can be validated by checking the locked versions of the images executing on the network devices. Such a method of locking and checking the image version is, however, too restrictive and difficult to handle during the upgrade. Specifically, improving version compatibility during or after frequent upgrading or patching network devices can be administratively inefficient and error prone. Additionally, performing version checking only might not be enough to determine the compatibility between the images in some scenarios.

Accordingly, a need exists for methods and apparatus that can effectively validate and improve image compatibility for network devices in a network.

SUMMARY

In some embodiments, an apparatus includes a network device configured to receive an anomaly database of a first image that stores a set of differences between the first image and a base image. The network device is configured to compare the anomaly database of the first image with an anomaly database of a second image storing a set of differences between the second image and the base image to determine if the first and second images include at least one incompatible critical feature or incompatible non-critical feature. The network device is configured to send a signal associated with a first action if the first and second images include the at least one incompatible critical feature. The network device is configured to send a signal associated with a second action different from the first action if the first and second images include the at least one incompatible non-critical feature.

DETAILED DESCRIPTION

In some embodiments, an apparatus includes a network device from a set of network devices within a network. The network device is configured to receive an anomaly database of a first image to be installed on at least one network device from the set of network devices. The anomaly database of the first image stores a set of differences between the first image and a base image. The network device is configured to compare the anomaly database of the first image with an anomaly database of a second image, which stores a set of differences between the second image and the base image. Such a comparison is to determine if the first image and the second image include at least one incompatible critical feature, and if the first image and the second image include at least one incompatible non-critical feature. In some embodiments, the at least one incompatible critical feature includes at least one feature associated with enabling communication between the set of network devices.

Furthermore, the network device is configured to send a signal associated with a first action if the first image and the second image include the at least one incompatible critical feature. In some embodiments, the first action is associated with preventing the first image from being installed on the at least one network device from the set of network devices. Similarly, the network device is configured to send a signal associated with a second action different from the first action if the first image and the second image include the at least one incompatible non-critical feature. In some embodiments, the second action is associated with providing a warning to a user regarding the at least one incompatible non-critical feature.

In some embodiments, the network device is a first network device from the set of network devices. The first network device is configured to compare the anomaly database of the first image with the anomaly database of the second image based on the second image being installed on a second network device from the set of network devices.

In some embodiments, an apparatus includes a network device configured to be operable within a network. The network device is configured to receive an image and instructions to install the image, which includes an image version identifier. In some embodiments, the image includes an anomaly database storing a set of differences between the image and a base image.

The network device is configured to identify a set of images installed on a set of network devices within the network and having an image version identifier different than the image version identifier of the image. In some embodiments, the network device is an access switch and at least one network device from the set of network devices is an aggregation switch. The network device is also configured to determine if the image and at least one image from the set of images include at least one incompatible critical feature, and if the image and at least one image from the set of images include at least one incompatible non-critical feature. In some embodiments, the at least one incompatible critical feature includes at least one feature associated with enabling communication between the network device and each network device from the set of network devices.

Furthermore, the network device is configured to send a signal associated with a first action if the image and at least one image from the set of images include the at least one incompatible critical feature. In some embodiments, the first action is associated with preventing the image from being installed on the network device. Similarly, the network device is configured to send a signal associated with a second action different from the first action if the image and at least one image from the set of images include the at least one incompatible non-critical feature. In some embodiments, the second action is associated with providing a warning to a user regarding the at least one incompatible non-critical feature.

In some embodiments, the network device is a first network device and the image is a first image. The first network device includes an image version identifier database storing an image version identifier associated with a second image installed on a second network device, which is from the set of network devices. The first network device is configured to compare the image version identifier of the first image with the image version identifier of the second image. The first network device is further configured to send a signal associated with the first action in response to a difference between the image version identifier of the first image and the image version identifier of the second image being greater than a difference threshold.

As used herein, a module can be, for example, any assembly and/or set of operatively-coupled electrical components, and can include, for example, a memory, a processor, electrical traces, optical connectors, software (executing or to be executed in hardware, and/or stored in memory) and/or the like.

As used herein, the singular forms "a," "an" and "the" include plural referents unless the context clearly dictates otherwise. Thus, for example, the term "an anomaly database" is intended to mean a single database associated with a specific image or a combination of data structures associated with storing image information of that specific image.

Figure 1:
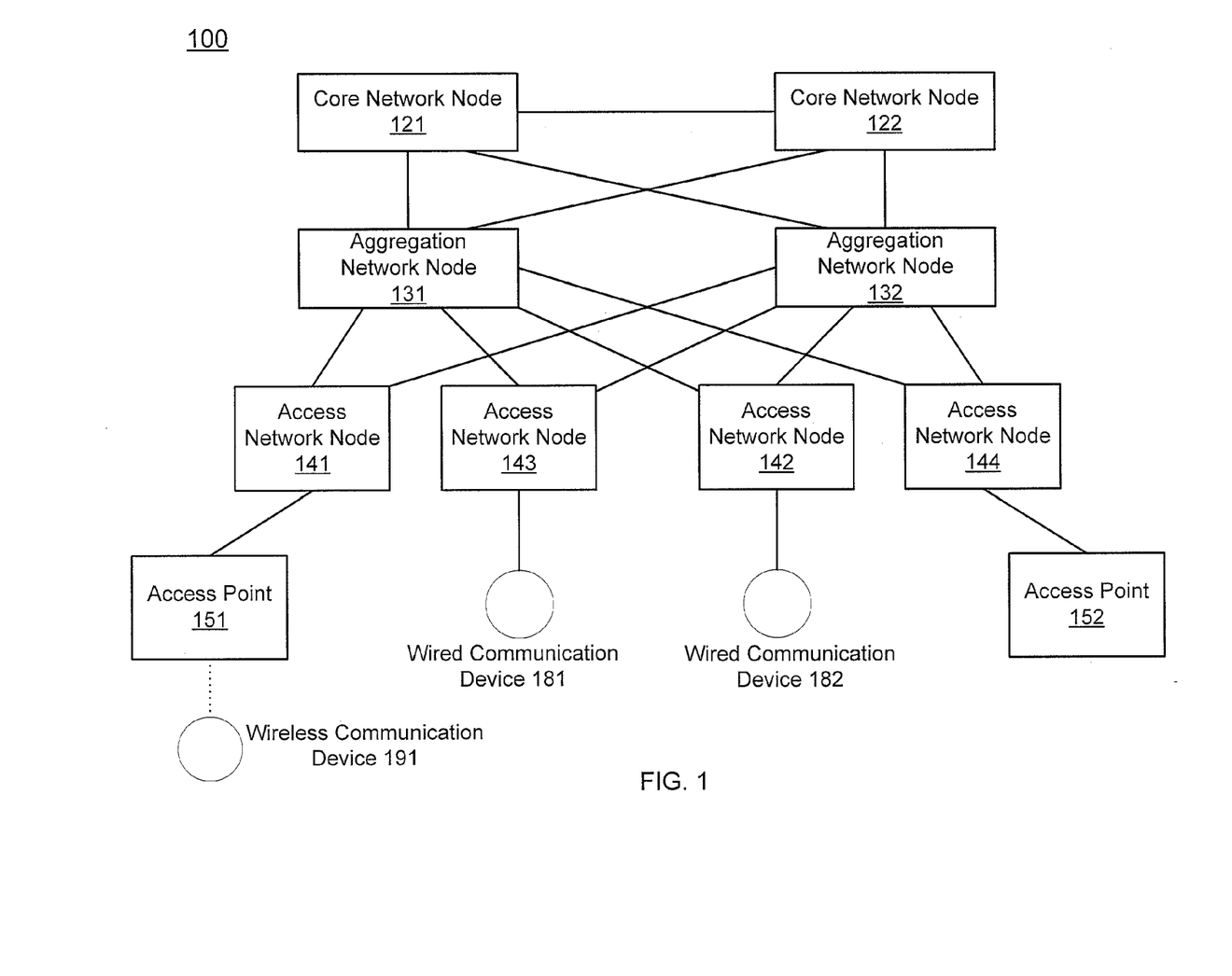
FIG. 1 is a schematic illustration of a network having multiple network nodes, according to an embodiment.

FIG. 1 is a schematic illustration of a network 100 having multiple network nodes, according to an embodiment. As shown in FIG. 1, the network 100 includes access points 151-152, access network nodes 141-144, aggregation network nodes 131-132, and core network nodes 121-122. The access point 151 is wirelessly coupled to a wireless communication device 191. The access network nodes 142, 143 are coupled to wired communication devices 182 and 181, respectively. The network nodes included in the network 100 can be configured collectively to manage and forward traffic (e.g., wired traffic, wireless traffic) for the communication devices that are operatively coupled to the network 100 (e.g., the wireless communication device 191, the wired communication devices 181-182).

A core network node (e.g., the core network nodes 121, 122) can be a high-capacity switching device positioned in the physical core, or backbone, of an enterprise network or any other type of network. In some cases, a core network node is known as a core switch, a tandem switch or a backbone switch. In the network 100, the core network nodes 121-122 are configured to connect the access devices (e.g., the access network nodes 141-144, the access points 151-152) with each other such that users operatively coupled to the network 100 via wired or wireless communication devices (e.g., the wired communication devices 181-182, the wireless communication device 191) can communicate with each other through the network 100. Furthermore, in some embodiments, the core network node 121 or 122 can be operatively coupled to another network (not shown in FIG. 1) such that access to information services (e.g., persistent data and applications) located within that network can be provided to users that are operatively coupled to the network 100 via wired or wireless communication devices.

As shown in FIG. 1, the core network nodes 121-122 are configured to operatively connect the aggregation network node 131 with the aggregation network node 132. The core network nodes 121-122 can be configured to forward packets of wired and/or wireless sessions between the aggregation network node 131 and the aggregation network node 132 based on, for example, IP (Internet Protocol) routing services. In other words, the core network nodes 121-122 can act as a router working in layer 3 (i.e., network layer) of the OSI (open systems interconnection) model for the network 100. Specifically, the core network nodes 121-122 can be configured to switch or route wired or wireless sessions' traffic received from the aggregation network node 131 or 132 towards the appropriate destination (e.g., a communication device operatively coupled to the network 100) of the traffic.

An access network node (e.g., the access network nodes 141-144) can be any device that can directly connect one or more wired communication devices (e.g., the wired communication devices 181, 182) to an enterprise network or any other type of network. Such an access network node can be, for example, a hub, an Ethernet switch, etc. In some cases, an access network node is known as an access switch, a network switch, or a switching hub. Furthermore, the access network nodes 141-144 can be configured to ensure packets are delivered between one or more aggregation network nodes, one or more wired communication devices, and/or one or more access points that are coupled to the access network nodes 141-144. In the network 100, a wired communication device (e.g., the wired communication devices 181, 182) can be any device that can receive packets from and/or send packets to an access network node through a wired connection, such as a desktop computer, a workstation, a printer, etc.

An aggregation network node (e.g., the aggregation network nodes 131, 132) can be any device that can be used to aggregate multiple access network nodes and to switch or route packets within a network, such as a router, a layer-3 switch, etc. Furthermore, the aggregation network nodes 131-132 can be configured to route packets received from one of the access network nodes 141-144 to another access network node 141-144 or a core network node 121-122, based on the routing information provided in the packet and the routing policy implemented at the aggregation network nodes 131-132. In some embodiments, a collection of aggregation network nodes and associated access devices (e.g., access network nodes, access points) having a common connection to a redundant set of core network nodes are referred to as a pod. As shown in FIG. 1, the aggregation network nodes 131-132 with their associated access network nodes 141-144 and access points 151-152 comprise a pod.

An access point (e.g., the access points 151, 152) can be any device that can connect a wireless communication device (e.g., the wireless communication device 191) to a network (e.g., via an access network node as shown in FIG. 1) using, for example, Wi-Fi, Bluetooth or other wireless communication standards. In some cases, an access point can be located on the same device together with an access network node, such as a wireless Ethernet router equipped with a wireless transceiver. In some other cases, an access point can be a stand-alone device, such as a wireless access point (WAP). Similar to a wired communication device, a wireless communication device can be any device that can receive packets from and/or send packets to an access point through a wireless connection. Such a wireless communication device can be, for example, a mobile phone, a Wi-Fi enabled laptop, a tablet, a Bluetooth earphone, etc.

In the network 100, the core network nodes 121-122, the aggregation network nodes 131-132, the access network nodes 141-144, and the access points 151-152 can be configured collectively to manage and forward wired and/or wireless traffic for one or more wired and/or wireless communication devices that are operatively coupled to the network 100. The core network nodes 121-122 and their associated network nodes including the access points 151-152, the access network nodes 141-144, and the aggregation network nodes 131-132 can be configured to switch, route, or tunnel packets of a wired or wireless session that are received from a wired or wireless communication device, to another network node or another core network node, based on a destination address (e.g., a destination IP address, a destination media access control (MAC) address) included in the packets.

In some embodiments, some wired traffic that is received at an aggregation network node from an access network node can be switched or routed to another access network node from the aggregation network node if the traffic is destined to a destination device within the same pod that includes the two access network nodes and the aggregation network node. In contrast, the wired traffic destined to a destination device located in another pod can be forwarded to a core network node, from which the traffic can be forwarded into the other pod.

In some embodiments, the core network nodes 121-122 and the access points 151-152 can be configured collectively to manage and forward wireless traffic through intervening wired network nodes (e.g., the access network nodes 141-144, the aggregation network nodes 131-132). Specifically, the core network node 121 or 122 can be configured to receive encapsulated packets of a wireless session from the access point 151 or 152 via, for example, a layer-3 tunnel through the intervening wired network nodes. The encapsulated packets can be originated at a wireless communication device (e.g., the wireless communication device 191) operatively coupled to the access point 151 or 152 and destined to, for example, another wireless communication device or a wired communication device operatively coupled to the network 100. In response to receiving the encapsulated packets, the core network node 121 or 122 can be configured to decapsulate the received packets to determine the destination of the packets. Based on the destination of the packets, the core network node 121 or 122 can be configured to forward the packets to the destination using an appropriate method (e.g., through or not through a tunnel).

Similarly, the core network node 121 or 122 can be configured to receive packets from a source device (e.g., a wired or wireless communication device operatively coupled to the network 100) destined to the access point 151 or 152. The core network node 121 or 122 can be configured to encapsulate the packets according to, for example, a layer-3 tunneling protocol, and then send the encapsulated packets to the access point 151 or 152 via, for example, a layer-3 tunnel through the intervening wired network nodes. The encapsulated packets can then be decapsulated at the access point 151 or 152 and forwarded to, for example, a wireless communication device operatively coupled to the access point 151 or 152. In some cases, a layer-3 tunnel can be an Ethernet over layer-3 tunnel, such as a CAPWAP (control and provisioning of wireless access points) tunnel, an Ethernet-in-GRE (generic routing encapsulation) tunnel, etc.

In some embodiments, a WLAN (wireless local area network) controller (not shown in FIG. 1) can be used to handle the configuration of the access points 151-152 and act as a centralized controller configured to manage wireless sessions in the network 100. In such embodiments, packets of wireless sessions can be encapsulated and tunneled between the access points 151-152 and the WLAN controller through intervening wired network nodes and core network nodes, similar to the approach described above.

In some embodiments, each network device within the network 100, including the core network nodes 121-121, the aggregation network nodes 131-132, the access network nodes 141-144, and the access points 151-152, executes a software image at that network device. The image associated with a network device can be a specific software package that includes various types of software installed and executed at that network device. In some embodiments, the image associated with a network device can include an operating system that is initially executed when the network device is booted up. In some embodiments, the image associated with a network device can include software that enables the network device to perform various functionalities associated with the network device such as, for example, communicating with other network devices within the network 100, receiving and forwarding data packets, etc.

In some embodiments, different images can be installed and executed at different types of network devices within the network 100. For example, the images installed and executed at the core network nodes 121-122 can be different from the images installed and executed at the aggregation network nodes 131-132. In some embodiments, different images can be installed and executed at different network devices of the same type. For example, the image installed and executed at the access network node 141 can be different from the image installed and executed at the access network node 142. In some embodiments, each network device within the network 100 can store and maintain image information associated with the image installed and executed at that network device, as well as image information associated with the images installed and executed at some or all other network devices within the network 100. In such embodiments, configuration files of a network device that contains image information associated with that network device can be shared with some or all other network devices in the network 100. In some embodiments, as described with respect to FIGS. 2-3, the image information can be stored in, for example, an image database within a memory of the network device.

In some embodiments, image installed and executed at a network device can be upgraded to, for example, a newer version of the image, and/or a new network device can be connected to a network device of the network 100, and thus included in the network 100. In such embodiments, image validation can be performed for the upgraded image or the image associated with the newly-included network device to determine if the corresponding network device can participate in the operations of the network 100, and particularly, to determine if the corresponding network device can communicate with other network devices in the network 100. In some embodiments, as described with respect to FIGS. 2-3, the image validation can be operated by, for example, an image validation module in the network device.

Figure 2:
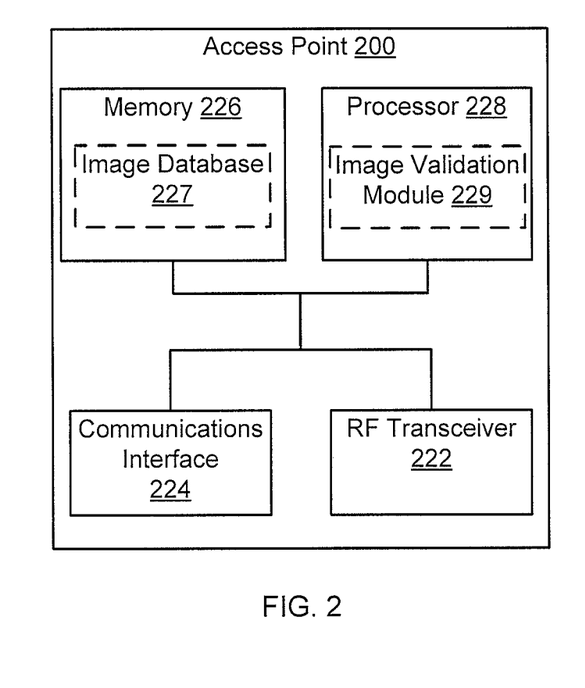
FIG. 2 is a system block diagram of an access point, according to an embodiment.

FIG. 2 is a system block diagram of an access point 200, according to an embodiment. The access point 200 can be structurally and functionally similar to the access points 151-152 shown and described with respect to FIG. 1. Specifically, the access point 200 can be any device that connects one or more wireless communication devices to a network (e.g., via an access network node) using for example, Wi-Fi, Bluetooth or other wireless communication standards. For example, the access point 200 can be a WAP. Similar to the network 100 shown in FIG. 1, the network that includes the access point 200 can also include other network devices such as access network nodes, aggregation network nodes, and/or core network nodes.

As shown in FIG. 2, the access point 200 includes a RF transceiver 222, a communications interface 224, a memory 226 that contains an image database 227, and a processor 228 that contains an image validation module 229. Each component of the access point 200 is operatively coupled to each of the remaining components of the access point 200. Furthermore, the operation of the RF transceiver 222 (e.g., transmit/receive data), the communications interface 224 (e.g., transmit/receive data), the image validation module 229 (e.g., validate images), as well as the manipulation on the memory 226 (e.g., update the image database 227), each is controlled by the processor 228.

In some embodiments, the access point 200 can communicate with one or more wireless communication devices (e.g., a Wi-Fi enabled laptop, a mobile phone) using any suitable wireless communication standard such as, for example, Wi-Fi, Bluetooth, and/or the like. Specifically, the access point 200 can be configured to receive data and/or send data through the RF transceiver 222 when communicating with a wireless communication device. Furthermore, in some embodiments, an access point of a network uses one wireless communication standard to wirelessly communicate with one or more wireless communication devices operatively coupled to the access point; while another access point of the network uses a different wireless communication standard to wirelessly communicate with one or more wireless communication devices operatively coupled to the other access point. For example, as shown in FIG. 1, the access point 151 can receive data packets through its RF transceiver from the wireless communication device 191 (e.g., a Wi-Fi enabled laptop) based on the Wi-Fi standard; while the access point 152 can send data packets from its RF transceiver to another wireless communication device (e.g., a Bluetooth-enabled mobile phone, not shown in FIG. 1) based on the Bluetooth standard.

In some embodiments, the access point 200 can be operatively coupled to, for example, an access network node by implementing a wired connection between the communications interface 224 and the counterpart (e.g., a communications interface) of the access network node. The wired connection can be, for example, twisted-pair electrical signaling via electrical cables, fiber-optic signaling via fiber-optic cables, and/or the like. As such, the access point 200 can be configured to receive data and/or send data through the communications interface 224, which is connected with the communications interface of an access network node, when the access point 200 is communicating with the access network node. Furthermore, in some embodiments, an access point of a network implements a wired connection with an access network node coupled to the access point; while another access point of the network implements a different wired connection with an access network node coupled to the other access point. For example, as shown in FIG. 1, the access point 151 can implement one wired connection such as twisted-pair electrical signaling to connect with the access network node 141; while the access point 152 can implement a different wired connection such as fiber-optic signaling to connect with the access network node 144.

In some embodiments, the memory 226 can be, for example, a random-access memory (RAM) (e.g., a dynamic RAM, a static RAM), a flash memory, a removable memory, and/or so forth. The image database 227 can store image information associated with the image installed and executed at the access point 200, as well as image information associated with the images installed and executed at other network devices (e.g., access network nodes, aggregation network nodes, core network nodes) in the network. In some embodiments, the image information associated with an image that is stored in the image database 227 can include, for example, an image version identifier and an anomaly database of the image. The anomaly database of an image is described in detail with respect to FIG. 4. In some embodiments, data other than image information can also be, stored in the memory 226, such as information associated with the potential user communication devices, information associated with tunneling packets to a core network node in the network, and/or the like.

The processor 228 can be any suitable processor capable of executing instructions. In some embodiments, the processor 228 can be a microcontroller, a field-programmable gate array (FPGA), an application specific integrated circuit (ASIC), and/or any other suitable processor. The image validation module 229 can be any combination of hardware and/or software (stored in and executing in hardware) configured to execute an image validation process when, for example, the image of the access point 200 is upgraded. Details of the image validation process are described below with respect to FIG. 1.

Figure 3:
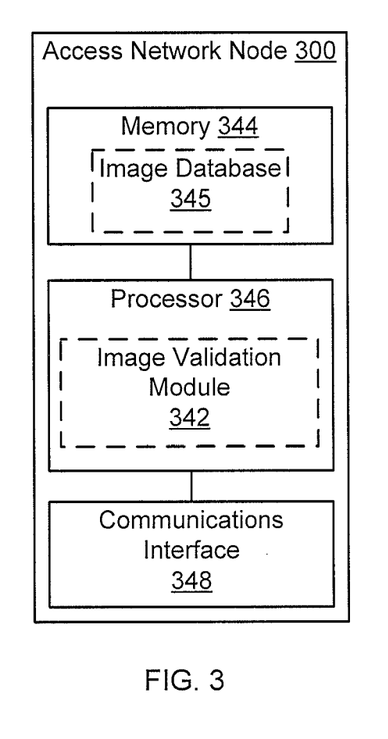
FIG. 3 is a system block diagram of an access network node, according to an embodiment.

FIG. 3 is a system block diagram of an access network node 300, according to an embodiment. The access network node 300 can be structurally and functionally similar to the access network nodes 141-144 shown and described with respect to FIG. 1. Specifically, the access network node 300 can be any device that connects one or more wired communication devices to a network, such as a hub, an Ethernet switch, etc. Similar to the network 100 shown in FIG. 1, the network that includes the access network node 300 can also include other network devices such as access points, aggregation network nodes, and/or core network nodes. In such a network, the access network node 300 can be configured to transmit packets between one or more aggregation network nodes, wired communication devices, and/or access points that are operatively coupled to the access network node 300.

As shown in FIG. 3, the access network node 300 includes a communications interface 348, a memory 344 that contains an image databases 345, and a processor 346 that contains an image validation module 342. Each component of the access network node 300 is operatively coupled to each of the remaining components of the access network node 300. Furthermore, the operation of the communications interface 348 (e.g., transmit/receive data), the image validation module 342 (e.g., validate images), as well as the manipulation on the memory 344 (e.g., update the image database 345), each is controlled by the processor 346.

In some embodiments, the communications interface 348 of the access network node 300 includes at least two ports (not shown in FIG. 3) that can be used to implement one or more wired connections between the access network node 300 and one or more access points, wired communication devices, and/or aggregation network nodes. The wired connections can be, for example, twisted-pair electrical signaling via electrical cables, fiber-optic signaling via fiber-optic cables, and/or the like. As such, the access network node 300 can be configured to receive data and/or send data through one or more ports of the communications interface 348, which are connected to the counterparts (e.g., communications interfaces) of one or more access points, wired communication devices, and/or aggregation network nodes. Furthermore, in some embodiments, the access network node 300 can implement a wired connection with one of (1) an access point, (2) a wired communication device, or (3) an aggregation network node, that is operatively coupled to the access network node 300 through one port of the communications interface 348. Similarly, the access network node 300 can implement a different wired connection with a remaining (1) access point, (2) wired communication device, or (3) aggregation network node, that is operatively coupled to the access network node 300 through another port of the communications interface 348. For example, as shown in FIG. 1, the access network node 141 can implement one wired connection such as twisted-pair electrical signaling to connect with the access point 151, while implementing a different wired connection such as fiber-optic signaling to connect with the aggregation network node 131.

In some embodiments, the memory 344 can be, for example, a RAM (e.g., a dynamic RAM, a static RAM), a flash memory, a removable memory, and/or so forth. Similar to the image database 227 shown and described with respect to FIG. 2, the image database 345 can store image information associated with the image installed and executed at the access network node 300, as well as image information associated with the images installed and executed at other network devices (e.g., access points, aggregation network nodes, core network nodes) in the network. In some embodiments, the image information associated with an image that is stored in the image database 345 can include, for example, an image version identifier and an anomaly database of the image. The anomaly database of an image is described in detail with respect to FIG. 4. In some embodiments, data other than image information can also be stored in the memory 345, such as information associated with the potential user communication devices, information associated with tunneling packets through the access network node 300, and/or the like.

Similar to the processor 228 shown and described with respect to FIG. 2, the processor 346 can be any suitable processor capable of executing instructions. In some embodiments, the processor 346 can be a microcontroller, a field-programmable gate array (FPGA), an application specific integrated circuit (ASIC), and/or any other suitable processor. The image validation module 342 can be any combination of hardware and/or software (stored in and executing in hardware) configured to execute an image validation process when, for example, the image of the access network node 300 is upgraded. Details of the image validation process are described below with respect to FIG. 1.

Returning to FIG. 1, each network device in the network 100 can store and maintain image information associated with some or all other network devices in the network 100. In some embodiments, such image information can be stored and maintained in, for example, an image database (e.g., the image database 227 of the access point 200 in FIG. 2, the image database 345 of the access network node 300 in FIG. 3) of the network device. For example, the aggregation network node 131 can store and maintain image information associated with at least the core network nodes 121-122 and the access network nodes 141-144 in an image database within a memory of the aggregation network node 131.

In some embodiments, in response to an image associated with a network device being changed (e.g., upgraded), the network device can be configured to send information associated with the change of the image to other network devices. Thus, the image information of the network device can be updated accordingly at the other network devices. As a result, each network device can maintain up-to-date image information associated with some or all other network devices in the network 100. For example, in response to the image of the core network node 122 being upgraded to a newer version, the information associated with the upgrade is sent from the core network node 122 to other network devices including the aggregation network node 131. As a result, the image information of the core network node 122 is updated accordingly at the aggregation network node 131. Similarly, in response to a new network device being connected to an existing network device of the network 100 and thus being included in the network 100, the existing network devices of the network 100 can be configured to send their image information to the new network device, such that an image validation process can be performed at the new network device. Furthermore, in some embodiments, the new network device can be configured to send its image information to the existing network devices as well.

In some embodiments, when an image associated with an existing network device is to be changed (e.g., upgraded) or a new network device is to be included in the network 100, the existing network device or the new network device can be configured to execute an image validation process. As a result, determined determination can be made on whether the corresponding network device (e.g., the existing network device after being upgraded, the new network device) can participate in the operations of the network 100, and particularly, if the corresponding network device can communicate with other network devices in the network 100. In some embodiments, such an image validation process can be executed at, for example, an image validation module (e.g., the image validation module 229 of the access point 200 in FIG. 2, the image validation module 342 of the access network node 300 in FIG. 3) of the corresponding network device.

In the example of FIG. 1, when the image associated with the aggregation network node 131 is to be upgraded (e.g., to a newer version), the aggregation network node 131 can receive a new image (e.g., an upgraded version of the existing image associated with the aggregation network node 131) that is to be installed at the aggregation network node 131, as well as instructions to install the new image. In some embodiments, the new image and the instructions can be provided to the aggregation network node 131 by, for example, a device operated by a network administrator or operator of the network 100. In some embodiments, the new image can include, for example, an image version identifier and an anomaly database of the new image. In some embodiments, as described with respect to FIG. 4 below, the image version identifier can be stored and maintained in the anomaly database. Based on the received new image, the aggregation network node 131 can be configured to execute an image validation process at, for example, an image validation module within the aggregation network node 131. In some embodiments, such an image validation process is executed prior to the new image being actually installed on the aggregation network node 131.

As described above, the image validation process is to determine if the aggregation network node 131, after being upgraded, can participate in the various operations of the network 100 without any conflict or performance degradation. Particularly, the image validation process is to determine if the aggregation network node 131, after being upgraded, can communicate with each of the other network devices (e.g., the core network nodes 121-122, the access network nodes 141-144) of the network 100. Specifically, the image validation process can be executed at the aggregation network node 131 to check potential incompatibilities between the new image of the aggregation network node 131 and the images of other network devices. The aggregation network node 131 can then take appropriate actions accordingly. As a result of the image validation process, a determination can be made as to whether the new image can be installed and executed on the aggregation network node 131.

In some embodiments, the image validation process can be executed at a network device in three steps. In the first step, version compatibility can be checked between the new image of the network device and the images of the other network devices. As described herein, each network device of the network 100 can store and maintain image information, including an image version identifier, of that network device and some or all of the other network devices. In some embodiments, an image version identifier can be a numerical value (e.g., an integer) or any other suitable form that can identify a version of the image. The image version identifier can be in the form of, for example, X.Y where X and Y are both integers. For example, the image version identifier for the image of the aggregation network node 131 can be 4.0; the image version identifiers for the images of the core network node 121-122 can be 2.2 and 4.0, respectively; and the image version identifiers for the images of the access network nodes

141-144 can be 1.5, 2.0, 3.6, and 4.0, respectively. In some embodiments, the network device can be configured to compare the image version identifier of the image associated with the network device with the image version identifiers of the images associated with the other network devices within the network 100. In the example of FIG. 1, the aggregation network node 131 can be configured to compare its image version identifier (i.e., 4.0) with the image version identifiers of the core network nodes 121-122 (i.e., 2.2, 4.0) and the access network nodes 141-144 (i.e., 1.5, 2.0, 3.6, 4.0).

A determination can be made as to whether the version compatibility check fails based on the result of comparisons between the image version identifiers. In some embodiments, when the image version identifier associated with the network device is compared with the image version identifiers associated with the other network devices, the version compatibility check is determined to fail if and only if a difference between the image version identifier associated with the network device and at least one of the image version identifiers associated with the other network devices is greater than a predetermined difference threshold. Additionally, the difference threshold can be configured or selected by, for example, a network administrator or operator of the network 100. For example, if the predetermined difference threshold is 2.0, the version compatibility check for the aggregation network node 131 is determined to fail because the difference between the image version identifier associated with the aggregation network node 131 (i.e., 4.0) and the image version identifier associated with the access network node 141 (i.e., 1.5) is calculated to be 2.5, which is greater than the predetermined difference threshold. For another example, if the predetermined difference threshold is 3.0, the version compatibility check for the aggregation network node 131 is determined to pass because none of the corresponding differences in image version identifiers is greater than the predetermined difference threshold.

In some other embodiments, the minimum image version identifier and the maximum image version identifier from a set of image version identifiers stored in the network device can be determined, where the set of image version identifiers includes the image version identifier associated with the network device and the image version identifiers associated with other network devices. The difference between the minimum and maximum image version identifiers can then be compared to a predetermined difference threshold to determine if the version compatibility check fails. In such embodiments, the version compatibility check is determined to fail if and only if the difference between the minimum and maximum image version identifier is greater than the predetermined difference threshold. In the example of FIG. 1, the minimum and maximum image version identifiers from the image version identifiers stored at the aggregation network node 131 are 1.5 (i.e., for the access network node 141) and 4.0 (i.e., for the core network node 122, the aggregation network node 131 and the access network node 144), respectively. The difference between the minimum and maximum image version identifiers is calculated to be 2.5. Thus, if the predetermined difference threshold is 2.0, the version compatibility check fails; if the predetermined difference threshold is 3.0, the version compatibility check passes.

In some embodiments, image version identifiers of network devices made by different manufactures or network devices from different series of products made by the same manufacture cannot be directly compared with each other to determine the version compatibility. In such embodiments, a network device can be configured to translate the image version identifiers into values on a common platform (e.g., a certain scaling setting) shared by various series of products from different manufactures. Translated values of image version identifiers can be compared with each other on such a common platform. Thus, a determination of version compatibility can be made based on the translated values of the image version identifiers on the common platform.

In some embodiments, in response to the version compatibility check failing at the network device, the image validation module of the network device can be configured to generate and send a signal to other components or modules of the network device. In some embodiments, the signal can be associated with preventing the new image being installed on the network device. For example, the signal can indicate to other components or modules of the network device to abort the installation of the new image on the network device. As a result, the subsequent step(s) of the image validation process will not be executed, and the new image will not be installed on the network device.

In some embodiments, the image validation module of the network device can be configured to present or send a message to a user device for a user (e.g., a network administrator, a network operator) that operates the network 100. The message can indicate the result of the version compatibility check and the resulting actions to the user. For example, if the new image of the aggregation network node 131 passes the version compatibility check, a message of "Version compatibility check passed . . . checking for base data structure compatibility . . . " can be presented to the user at the user device (e.g., on a monitor of the user device). Otherwise, if the new image of the aggregation network node 131 fails the version compatibility check, a message of "Incompatible version! Software upgrade aborted!" can be presented to the user at the user device.

In the second step of the image validation process, after passing the version compatibility check, base data structure compatibility can be checked between the new image of the network device and the images of the other network devices. Such a base data structure compatibility check can determine whether any catastrophic anomalies exist in the base data structure such that the network device (after being upgraded) will not be able to communicate with one or more of the other network devices of the network 100. In some embodiments, the network device can be configured to check one or more elements of the base data structure that are associated with communicating with other network devices. Such elements of the base data structure can include, for example, header format of a transmitted packet, transmission protocols, etc. The network device can be configured to compare the new image with the images of other network devices in terms of those elements. In some embodiments, as described with respect to FIG. 4 below, those elements of the base data structure associated with an image can be stored and maintained in an anomaly database of that image within the network device. In such embodiments, the anomaly databases of the images can be compared with each other at the network device to check base data structure compatibility for the new image of the network device.

In some embodiments, similar to the version compatibility check, the network device can be configured to conduct base data structure compatibility check between the new image of the network device and the image of each of the other network devices. If one or more catastrophic anomalies exist in the base data structure between the new image of the network device and the image of at least one another network device, the two network devices will not be able to communicate with each other. As a result, the base data structure compatibility check is determined to fail. Otherwise, no catastrophic anomaly exists in the base data structure between the new image of the network device and the image of each other network device, the network device will be able to communicate with each other network device. As a result, the base data structure compatibility check is determined to pass.

In the example of FIG. 1, the aggregation network node 131 can be configured to conduct base data structure compatibility check between the new image of the aggregation network node 131 and the images of the core network nodes 121-122 and the access network nodes 141-144. Specifically, the aggregation network node 131 can be configured to compare its new image with the images of the other network devices in terms of elements of the base data structure (e.g., header format of a transmitted packet, transmission protocols, etc.). For example, if all the images of the other network devices use IPv6 (Internet Protocol version 6) to transmit packets while the new image of the aggregation network node 131 uses IPv4 (Internet Protocol version 4), the aggregation network node 131 will not be able to communicate with other network devices because IPv4 is not forward compatible with IPv6. As a result, the base data structure compatibility check will fail.

In some embodiments, all the elements of the base data structure are considered as critical features associated with the images. Critical features associated with an image are the features that have to be compatible for the image to be installed at a network device. In such embodiments, if a catastrophic anomaly exists in an element of the base data structure between the new image of the network device and an image of another network device, the two images can be considered to include an incompatible critical feature. Similar to the version compatibility check described above, in response to the new image of the network device and another image including at least one incompatible critical feature, the image validation module of the network device can be configured to generate and send a signal to other components or modules of the network device. In some embodiments, the signal can be associated with preventing the new image being installed on the network device. For example, the signal can indicate to other components or modules of the network device to abort the installation of the new image on the network device. As a result, the subsequent step(s) of the image validation process will not be executed, and the new image will not be installed on the network device.

In some embodiments, similar to the version compatibility check described above, the image validation module of the network device can be configured to present or send a message to a user device of the user that operates the network 100. The message can indicate the result of the base data structure compatibility check and the resulting actions to the user. For example, if the new image of the aggregation network node 131 passes the base data structure compatibility check, a message of "Base data structure compatibility check passed . . . checking for feature compatibility . . . " can be presented to the user at the user device. Otherwise, if the new image of the aggregation network node 131 fails the base data structure compatibility check, a message of "Incompatible base data structure! Software upgrade aborted!" can be presented to the user at the user device.

In the third step of the image validation process, after passing the version compatibility check and the base data structure compatibility check, feature compatibility can be checked between the new image of the network device and the images of the other network devices. Such a feature compatibility check can determine whether any incompatible feature exists, other than the critical features previously checked in the base data structure compatibility check, between the new image of the network device and the images of the other network devices. In some embodiments, both critical and non-critical features are checked in the feature compatibility check. In other embodiments, only non-critical features are checked in the feature compatibility check, and all critical features are checked in the base data structure compatibility check.

In some embodiments, the features associated with the images that are checked in the feature compatibility check can include, for example, firewall filter type implemented in the image, PoE (Power over Ethernet) standard, PoE plus standard, PIM (Protocol-Independent Multicast), OSPF (Open Shortest Path First), etc. In some embodiments, the features checked in the feature compatibility check can be stored and maintained in, for example, anomaly databases of the images. In some embodiments, the anomaly databases can also store and maintain other image information associated with the images such as information associated with the version of the images (e.g., image version identifier) and information associated with the base data structure of the images (e.g., elements of the base data structure).

Figure 4:
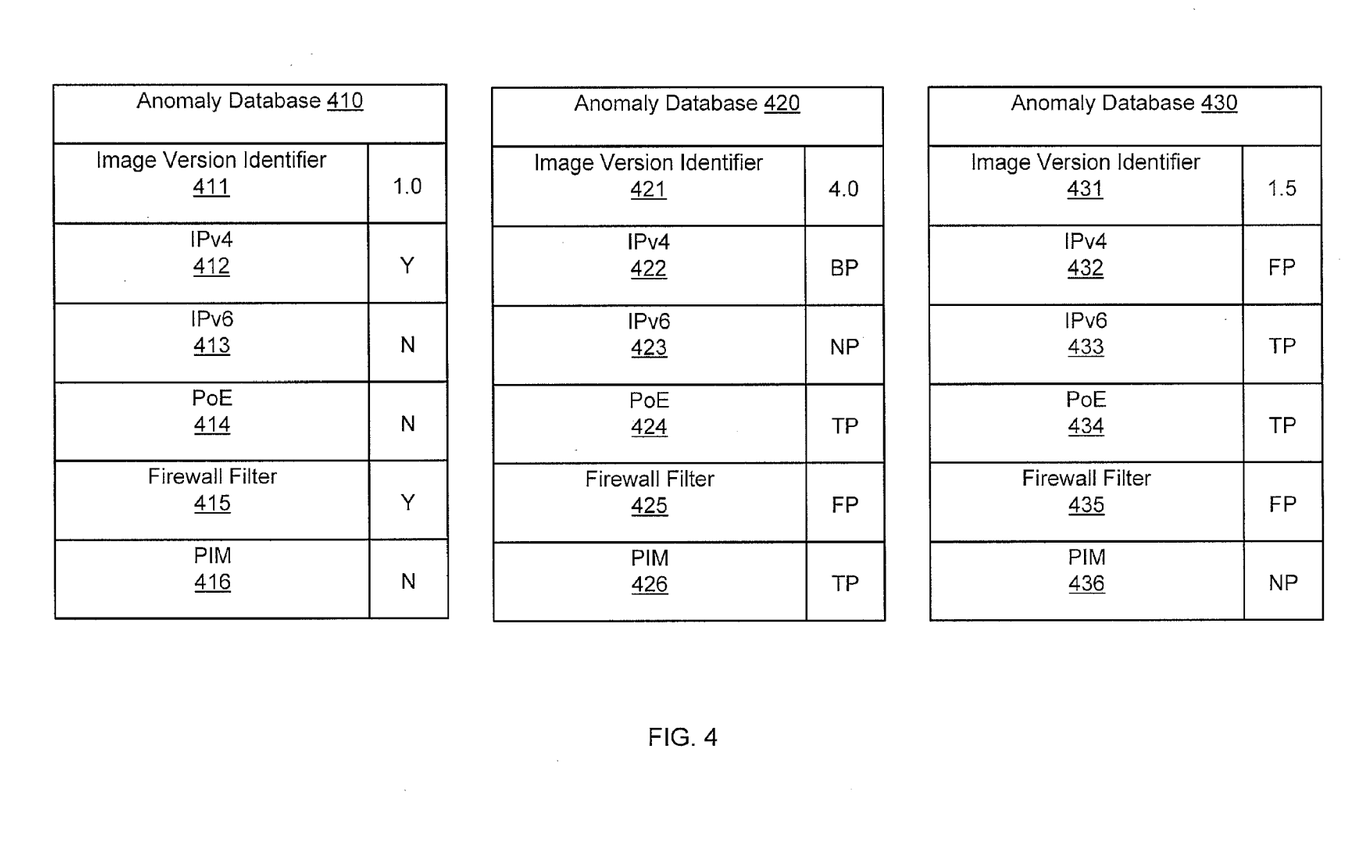
FIG. 4 is a schematic illustration of anomaly databases, according to an embodiment.

FIG. 4 is a schematic illustration of anomaly databases 410, 420 and 430, according to an embodiment. Each anomaly database 410-430 stores and maintains a list of image information for an image associated with one or more network devices within the network 100 shown and described with respect to FIG. 1. Specifically, in the example of FIG. 4, the anomaly database 410 stores and maintains image information for a base image that is associated with some or all of the network devices (i.e., some or all of core network nodes 121-122, aggregation network nodes 131-132, access network nodes 141-144, access points 151-152) within the network 100. The anomaly database 420 stores and maintains image information for a new image that is received and to be installed at the aggregation network node 131. The anomaly database 430 stores and maintains image information for an image that is installed and executed at the access network node 141. The anomaly databases for images installed and executed at other network devices within the network 100 can be similar to the anomaly databases 410, 420 and/or 430.

As shown in FIG. 4, the image information stored and maintained in the anomaly databases 410-430 include image information associated with the version of the images (e.g., image version identifiers 411, 421, 431), critical features associated with the base data structure of the images (e.g., IPv4 412, 422, 432 and IPv6 413, 423, 433), and non-critical features associated with the images (e.g., PoE 414, 424, 434; Firewall Filter 415, 525, 435; and PIM 416, 426, 436).

The anomaly database 410 is associated with and defined based on the base image. In some embodiments, such a base image can be, for example, the first release of the set of corresponding software that is installed and executed on one or more network devices (e.g., core network nodes 121-122, aggregation network nodes 131-132, access network nodes 141-144, access points 151-152) within the network 100. In other embodiments, the base image can be any arbitrary image installed and executed on a network device within the network 100. As shown in FIG. 4, the base image has an image version identifier 1.0, which is maintained in the anomaly database 410 associated with the image version identifier 411. The base image also has a set of features including IPv4 and firewall filter, which are identified by the "Y" (representing "Yes") associated with the IPv4 412 and the Firewall Filter 415 in the anomaly database 410. Furthermore, the base image does not have features such as IPv6, PoE and PIM, which are identified by the "N" (representing "No")

associated with the IPv6 413, the PoE 414 and the PIM 416, respectively, in the anomaly database 410.

The anomaly database 420 is associated with and defined based on the base image and a first image (referred to herein as a "new image") that is received and to be installed at the aggregation network node 131. Note that reference to the "new image" is for the aggregation network node 131 only in this example, not for any other network devices in the network 100. The new image is different than the base image. In some embodiments, the new image can be, for example, a subsequent release of the set of software with respect to the first release that is represented by the base image. The anomaly database 420 is defined and maintained for the new image with respect to the base image. Specifically, image information of the new image is compared with image information of the base image in terms of each critical or non-critical feature maintained in the anomaly databases 410-430, and the results of the comparisons are included in the anomaly database 420 corresponding to those critical and non-critical features. Similarly speaking, the anomaly database 420 stores a set of differences between the new image and the base image.

As shown in FIG. 4, the new image has a set of features including IPv4, PoE and PIM. The new image does not have features such as IPv6 and firewall filter. When the new image is compared with the base image in terms of those features, it can be determined that the feature IPv4 is present for both images and the feature IPv6 is not present for neither of the two images. As a result, the IPv4 422 is identified with "BP" (representing "Both Present"), and the IPv6 423 is identified with "NP" (representing "Not Present"). It can also be determined that the features PoE and PIM are not present for the base image but present for the new image. As a result, the PoE 424 and PIM 426 are both identified with "TP" (representing "To-Present"), which indicates an upgrade from the base image to the new image. It can further be determined that the feature firewall filter is present for the base image but not present for the new image. As a result, the Firewall Filter 425 is identified with "FP" (representing "From-Present"), which indicates a downgrade from the base image to the new image. Thus, the features of the new image can be determined based on the anomaly database 420.

Additionally, the new image has an image version identifier 4.0, which is maintained in the anomaly database 420 associated with the image version identifier 421. Alternatively, although not shown in FIG. 4, the difference between the image version identifiers of the base image and the new image can be maintained in the anomaly database 420. In that case, a value 3.0 can be identified in the anomaly database 420 associated with the image version identifier 421.

Similarly to the anomaly database 420, the anomaly database 430 is associated with and defined based on the base image and an image (referred to herein as an "installed image") that is installed and executed at the access network node 141. Note that reference to the installed image is for the access network node 141 only in this example, not for any other network devices in the network 100. The installed image is different than the base image or the new image. In some embodiments, the installed image can be, for example, a release of the set of software different than the release associated with the new image and subsequent to the first release associated with the base image. The anomaly database 430 is defined and maintained for the installed image with respect to the base image. Specifically, image information of the installed image is compared with image information of the base image in terms of each critical or non-critical feature maintained in the anomaly databases 410-430, and the results of the comparisons are included in the anomaly database 430 corresponding to those critical and non-critical features. Similarly speaking, the anomaly database 430 stores a set of differences between the installed image and the base image.

As shown in FIG. 4, the installed image has a set of features including IPv6 and PoE. The installed image does not have features such as IPv4, firewall filter and PIM. When the installed image is compared with the base image in terms of those features, it can be determined that the feature PIM is not present for neither of the two images. As a result, the PIM 436 is identified with "NP". It can also be determined that the features IPv6 and PoE are not present for the base image but present for the installed image. As a result, the IPv6 433 and PoE 434 are both identified with "TP". It can further be determined that the features IPv4 and firewall filter are present for the base image but not present for the installed image. As a result, the IPv4 432 and the Firewall Filter 435 are both identified with "FP". Thus, the features of the installed image can be determined based on the anomaly database 430. Additionally, the installed image has an image version identifier 1.5, which is maintained in the anomaly database 430 associated with the image version identifier 431.

Returning to FIG. 1, in some embodiments, the aggregation network node 131 can store and maintain an anomaly database for each image associated with a set of other network devices in the network 100. For example, the aggregation network node 131 can store and maintain an anomaly database for each of the core network nodes 121-122 and the access network nodes 141-144. Specifically, the aggregation network node 131 can store and maintain the anomaly database 430 that is associated with the image installed and executed at the access network node 141. The anomaly databases for images associated with other network devices within the network 100 that are stored and maintained in the aggregation network node 131 can be similar to the anomaly databases 420 and 430.

In some embodiments, the aggregation network node 131 can store the anomaly database 410 associated with the base image. In such embodiments, after the aggregation network node 131 receives the new image and instructions to install the new image, the aggregation network node 131 can be configured to define the anomaly database 420 for the new image based on the image information of the new image and the anomaly database 410 for the base image. In some other embodiments, the anomaly database 410 for the base image can be stored in a device (e.g., a device not shown in FIG. 1, another network device shown in FIG. 1) operatively coupled to the aggregation network node 131. In such embodiments, after the aggregation network node 131 receives the new image, the aggregation network node 131 can be configured to retrieve image information of the base image from the device, and then define the anomaly database 420 for the new image based on the image information of the new image and the base image. Alternatively, the aggregation network node 131 can be configured to send image information of the new image to the device, which can define the anomaly database 420 and then send it to the aggregation network node 131.

In some embodiments, to check image compatibility (including version compatibility, base data structure compatibility, and/or feature compatibility) between two images at a network device, the network device can be configured to compare the anomaly databases of the two images. As described above, such a comparison can include up to three steps: a version compatibility check as the first step, a base data structure compatibility check as the second step, and a feature compatibility check as the third step. In the example of FIGS. 1 and 4, to conduct image validation for the new image for the aggregation network node 131, the aggregation network node 131 can be configured to compare the anomaly database for the new image (i.e., the anomaly database 420) with the anomaly database for each image (e.g., the anomaly database 430) of the other network devices.

For example, if the anomaly database 420 for the new image is compared with the anomaly database 430 for the image associated with the access network node 141, version compatibility can be checked by comparing the image version identifier 421 and the image version identifier 431; base data structure compatibility can be checked by comparing the critical features IPv4 422, IPv6 423 with IPv4 432 and IPv6 433, respectively; and feature compatibility can be checked by comparing the non-critical features PoE 424, Firewall Filter 425, PIM 426 with PoE 434, Firewall Filter 435 and PIM 436, respectively. As a result, a determination can be made that the new image for the aggregation network node 131 and the image for the access network node 141 include compatible non-critical features of PoE and firewall filter; incompatible critical features of IPv4/IPv6; and incompatible non-critical feature of PIM.

In some embodiments, the image validation module (e.g., the image validation module 227 in FIG. 2, the image validation module 342 in FIG. 3) of the network device can be configured to send a signal associated with an appropriate action corresponding to the result of the comparison between the anomaly databases. During the base data structure compatibility check and/or the feature compatibility check, the image validation module of the network device can be configured to send a signal associated with a first action if the two images include at least one incompatible critical feature (e.g., transmission protocol). In some embodiments, the first action can be associated with aborting the installation of the new image at the network device. During the feature compatibility check, the network device can be configured to send a signal associated with a second action if the two images include at least one incompatible non-critical feature (e.g., PoE). In some embodiments, the second action can be associated with providing a warning to a user regarding the at least one incompatible non-critical feature. In some embodiments, if the two images include at least one incompatible critical feature and at least one incompatible non-critical feature (during the feature compatibility check), the network device can be configured to send a signal associated with the first action, but not to send a signal associated with the second action. In some other embodiments, if the two images include at least one incompatible critical feature and at least one incompatible non-critical feature, the network device can be configured to send both a signal associated with the first action and a signal associated with the second action. Furthermore, in response to receiving the signal from the image validation module of the network device, other components or modules of the network device can be configured to execute the corresponding action accordingly based on the received signal.

In the example of FIGS. 1 and 4, the image validation module of the aggregation network node 131 can be configured to send one or more signals associated with one or more actions corresponding to the result of the comparison between the anomaly database 420 and the anomaly databases for the images of the other network devices (e.g., the anomaly database 430 for the image of the access network node 141).

For example, assuming the image validation process for the image to be installed and executed at the aggregation network node 131 (i.e., associated with the anomaly database 420) and the image of the access network node 141 (i.e., associated with the anomaly database 430) has passed the version compatibility check, the image validation process is at the step of the base data structure compatibility check. In response to the anomaly database 420 and the anomaly database 430 including incompatible critical features IPv4 and IPv6, the image validation module of the aggregation network node 131 can be configured to send a signal associated with aborting the installation of the image at the aggregation network node 131. As a result, other component(s) or module(s) of the aggregation network node 131 can execute the action accordingly such that the new image will not be installed at the aggregation network node 131.

For another example, assuming the image validation process for the image to be installed and executed at the aggregation network node 131 and the image of the core network node 121 has passed the version compatibility check and the base data structure compatibility check, the image validation process is at the step of the feature compatibility check. In response to the anomaly database 420 and the anomaly database associated with the image of the core network node 121 (not shown in FIG. 4) including at least one incompatible non-critical feature PoE, the image validation module of the aggregation network node 131 can be configured to send a signal associated with warning the user regarding the incompatible feature of PoE. As a result, a message of "The PoE feature may not be completely supported" can be presented to the user at a user device (e.g., on a monitor of the user device).

Although only the image validation process for upgrading the image of the aggregation network node 131 is described herein with respect to FIGS. 1 and 4, it should be understood that image validation for other scenarios can be performed in a similar method. For example, when an image of an existing network device is to be changed, replaced, or downgraded, image validation can be performed for the new image of the existing network device in a similar method as described herein. For another example, when a new network device is to be included in the network, image validation can be performed for the image of the new network device in a similar method as described herein.

Figure 5:
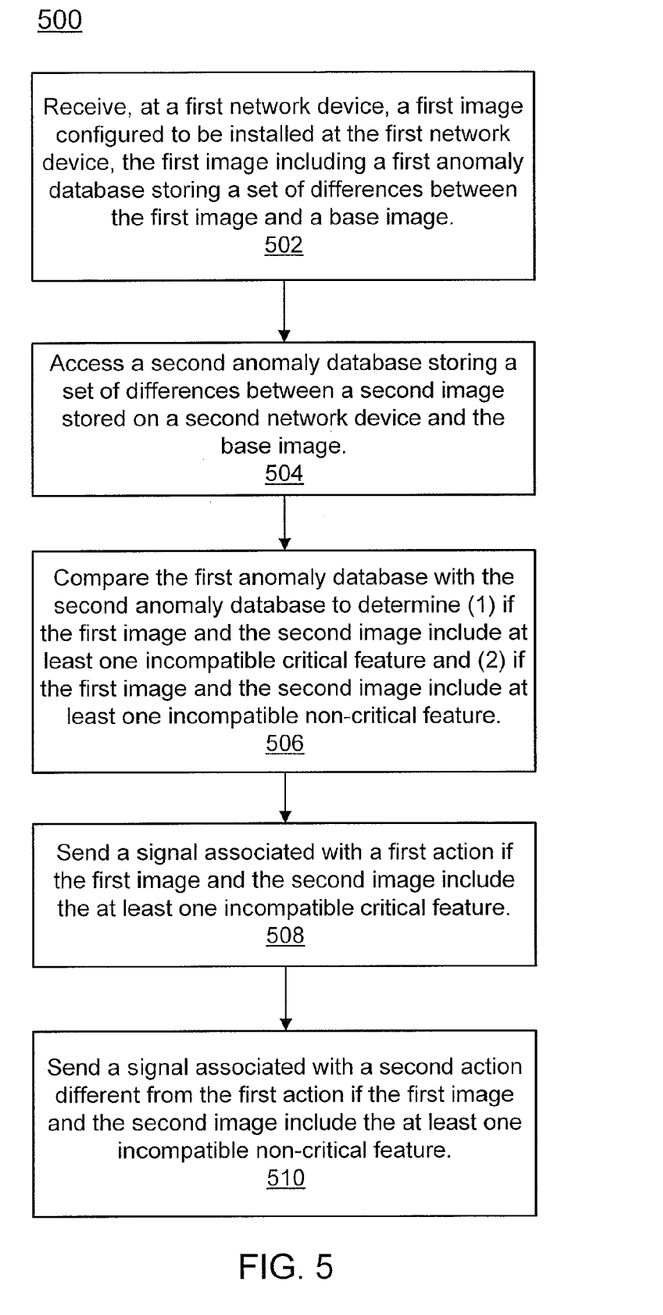
FIG. 5 is a flow chart illustrating a method for image validation, according to an embodiment.

FIG. 5 is a flow chart illustrating a method for image validation, according to an embodiment. In some embodiments, a memory (e.g., the memory 226 in FIG. 2, the memory 334 in FIG. 3) within a network device (e.g., an access point, an access network node, an aggregation network node, a core network node) hosting an image validation module (e.g., the image validation module 229 in FIG. 2, the image validation module 342 in FIG. 3) includes a non-transitory processor-readable medium that stores code representing instructions to be executed by a processor (e.g., the processor 228 in FIG. 2, the processor 346 in FIG. 3) of the network device. Some of the instructions can be executed to cause the processor to execute a series of operations with respect to validating an image that is to be installed at the network device.

At 502, a first image configured to be installed at a first network device can be received at the first network device. The first image includes a first anomaly database storing a set of differences between the first image and a base image. In some embodiments, the first network device can be an access switch such as, for example, an access network node or an aggregation network node. In some embodiments, the received first image can be stored in, for example, an image database within a memory of the first network device. In some embodiments, the first anomaly database can store and maintain image information associated with the first image, such as information associated with the version of the first image, the critical and non-critical features of the first image.

In the example of FIGS. 1-4, a first image configured to be installed at the aggregation network node 131 can be received at the aggregation network node 131. The first image can include the anomaly database 420 storing a set of differences between the first image and a base image, including information associated with the image version identifier, critical features IPv4 and IPv6, and non-critical features PoE, firewall filter, and PIM. Furthermore, the received first image including the anomaly database 420 can be stored in an image database within a memory (e.g., the image database 227 within the memory 226, the image database 345 within the memory 344) of the aggregation network node 131. Additionally, image information of the base image is maintained in the anomaly database 410, which can also be stored in the image database within the memory of the aggregation network node 131.

At 504, a second anomaly database can be accessed. The second anomaly database stores a set of differences between a second image stored on a second network device and the base image. In some embodiments, similar to the first network device, the second network device can be an access switch such as, for example, an access network node or an aggregation network node. In some embodiments, similar to the first anomaly database, the second anomaly database can be stored in the image database within the memory of the first network device. Furthermore, the second anomaly database can store and maintain image information associated with the second image, such as information associated with the version of the second image, the critical and non-critical features of the second image. In some embodiments, to access the second anomaly database, an image identifier for the second image can be determined at the first network device in response to receiving the first image. The image identifier for the second image can then be used to access the second anomaly database at the first network device.

In the example of FIGS. 1-4, the anomaly database 430 associated with a second image that is installed and executed at the access network node 141 can be stored and maintained in the image database within the memory of the aggregation network node 131. Thus, the anomaly database 430 can be accessed by, for example, an image validation module (e.g., the image validation module 229 in FIG. 2, the image validation module 342 in FIG. 3) of the aggregation network node 131. The anomaly database 430 stores a set of differences between the second image of the access network node 141 and the base image, including information associated with the image version identifier, critical features IPv4 and IPv6, and non-critical features PoE, firewall filter, and PIM. In some embodiments, to access the anomaly database 430, an image identifier for the second image (not shown in FIGS. 1-4) can be determined at the aggregation network node 131 in response to receiving the first image. The image identifier for the second image can then be used to access the anomaly database 430 from the image database of the aggregation network node 131.

At 506, the first anomaly database can be compared with the second anomaly database to determine if the first image and the second image include at least one incompatible critical feature, and if the first image and the second image include at least one incompatible non-critical feature. Furthermore, in some embodiments, an image version identifier of the first image can be compared with an image version identifier of the second image.

In the example of FIGS. 1-4, the anomaly database 420 can be compared with the anomaly database 430 in each of the elements stored and maintained within the two anomaly databases. Specifically, the image version identifier 421 of the anomaly database 420 can be compared with the image version identifier 431 of the anomaly database 430. Furthermore, the anomaly database 420 can be compared with the anomaly database 430 to determine if the first and the second images include at least one incompatible critical feature (e.g., IPv4, IPv6), and if the first and second images include at least one incompatible non-critical feature (e.g., PoE, firewall filter, PIM).

At 508, a signal associated with a first action can be sent if the first image and the second image include the at least one incompatible critical feature. In some embodiments, the at least one incompatible critical feature can include at least one feature associated with enabling communication between the first network device and the second network device. In some embodiments, the signal associated with the first action can be sent in response to a difference between the image version identifier of the first image and the image version identifier of the second image being greater than a difference threshold. In some embodiments, the first action can be associated with preventing the first image from being installed on the first network device.

In the example of FIGS. 1-4, a signal associated with a first action can be sent in response to a difference between the image version identifier 421 of the first image and the image version identifier 431 of the second image being greater than a predetermined difference threshold (e.g., 2.0, 3.0). In some embodiments, such a first action can be associated with aborting the installation of the first image at the aggregation network node 131. As a result, the first action can be executed accordingly at the aggregation network node 131, and the first image will not be installed at the aggregation network node 131. Similarly, a signal associated with such a first action can be sent if the first and the second images include at least one incompatible critical feature, such as incompatible IPv4 and/or incompatible IPv6. In some embodiments, the incompatible critical feature(s) between the first and the second images can be associated with enabling communication between the aggregation network node 131 and the access network node 141. Such critical features can include, for example, header format of a transmitted packet, transmission protocols, etc.

At 510, a signal associated with a second action can be sent if the first image and the second image include the at least one incompatible non-critical feature, where the second action is different from the first action. In some embodiments, the second action can be associated with providing a warning to a user regarding the at least one incompatible non-critical feature.

In the example of FIGS. 1-4, a signal associated with a second action can be sent if the first and the second images include at least one incompatible non-critical feature, such as incompatible PoE, firewall filter, and/or PIM. In some embodiments, such a second action can be associated with providing a warning to a user regarding the incompatible non-critical feature(s). As a result, the second action can be executed accordingly at the aggregation network node 131, and the user will be notified about the incompatibility in the non-critical feature(s) between the two images.

While shown and described above with respect to FIGS. 1-4 as image validation being done on a peer-to-peer basis between a network device and each other network device (i.e., an image of a first network device being validated against an image of each other network device at the first network device), in other embodiments, image validation can be done on a centralized basis. That is, image information (e.g., anomaly database) for the image of each network device within the network can be gathered (received at or sent to) and maintained at a centralized network device, and image validation for each image can be done at that centralized network device. In such embodiments, the remaining network devices do not need to store and maintain image information for the images of other network devices. Instead, the image validation task can be sent from the remaining network devices to the centralized network device and performed at the centralized network device. The centralized network device can be configured to send a signal to the remaining network devices such that appropriate actions can be executed at the remaining network devices as a result of the image validation process. Furthermore, in some embodiments, image validation can be done in a hybrid fashion within a network. For example, image validation can be done on a peer-to-peer basis within a certain network segment (e.g., a virtual local area network (VLAN)), and on a centralized basis within another network segment.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

While various embodiments have been described above, it should be understood that they have been presented by way of example only, not limitation, and various changes in form and details may be made. Any portion of the apparatus and/or methods described herein may be combined in any combination, except mutually exclusive combinations. The embodiments described herein can include various combinations and/or sub-combinations of the functions, components and/or features of the different embodiments described.

What is claimed is:

1. An apparatus, comprising:
a network device configured to be included within a plurality of network devices within a network, the network device configured to receive an anomaly database of a first image to be installed on at least one network device from the plurality of network devices, the anomaly database of the first image storing a set of differences between the first image and a base image,
the network device configured to compare the anomaly database of the first image with an anomaly database of a second image storing a set of differences between the second image and the base image to determine (1) when the first image and the second image include at least one incompatible critical feature, and (2) when the first image and the second image include at least one incompatible non-critical feature, the at least one incompatible non-critical feature being at least one of a power over Ethernet (PoE) standard or a PoE plus standard, used by the first image but not the second image,
the network device configured to send a signal associated with a first action if the first image and the second image include the at least one incompatible critical feature, the network device configured to send a signal associated with a second action different from the first action if the first image and the second image include the at least one incompatible non-critical feature.

2. The apparatus of claim 1, wherein the first action is associated with preventing the first image from being installed on the at least One network device from the plurality of network devices.

3. The apparatus of claim 1, wherein the second action is associated with providing a warning to a user regarding the at least one incompatible non-critical feature.

4. The apparatus of claim 1, wherein the plurality of network devices includes at least one access switch and at least one aggregation switch.

5. The apparatus of claim 1, wherein the network device is a first network device from the plurality of network devices, the first network device is configured to compare the anomaly database of the first image with the anomaly database of the second image based on the second image being installed on a second network device from the plurality of network devices.

6. An apparatus, comprising:
a network device configured to be operable within a network, the network device configured to receive an image and instructions to install the image, the image including an image version identifier,
the network device configured to identify a set of images installed on a set of network devices within the network and having an image version identifier different than the image version identifier of the image, the network device configured to determine (1) when the image and at least one image from the set of images include at least one incompatible critical feature, and (2) when the image and at least one image from the set of images include at least one incompatible non-critical feature, the at least one incompatible non-critical feature being at least one of a power over Ethernet (PoE) standard or a PoE plus standard, used by the first image but not the second image,
the network device configured to send a signal associated with a first action if the image and at least one image from the set of images include the at least one incompatible critical feature, the network device configured to send a signal associated with a second action different from the first action if the image and at least one image from the set of images include the at least one incompatible non-critical feature.

7. The apparatus of claim 6, wherein the first action is associated with preventing the image from being installed on the network device.

8. The apparatus of claim 6, wherein the second action is associated with providing a warning to a user regarding the at least one incompatible non-critical feature.

9. The apparatus of claim 6, wherein the image includes an anomaly database storing a set of differences between the image and a base image.

10. The apparatus of claim 6, wherein the network device is a first network device and the image is a first image, the first network device includes an image version identifier database storing an image version identifier associated with a second image installed on a second network device, the second network device being from the set of network devices, the first network device configured to compare the image version identifier of the first image with the image version identifier of the second image; and the first network device configured to send a signal associated with the first action in response to a difference between the image version identifier of the first image and the image version identifier of the second image being greater than a difference threshold.

11. The apparatus of claim 6, wherein the network device is an access switch and at least one network device from the set of network devices is an aggregation switch.

12. A non-transitory processor-readable medium storing code representing instructions to be executed by a processor, the code comprising code to cause the processor to:

receive, at a first network device, a first image configured to be installed at the first network device, the first image including a first anomaly database storing a set of differences between the first image and a base image;

access a second anomaly database storing a set of differences between a second image stored on a second network device and the base image;

compare the first anomaly database with the second anomaly database to determine (1) when the first image and the second image include at least one incompatible critical feature, and (2) when the first image and the second image include at least one incompatible non-critical feature, the at least one incompatible non-critical feature being at least one of a power over Ethernet (PoE) standard or a PoE plus standard, used by the first image but not the second image;

send a signal associated with a first action if the first image and the second image include the at least one incompatible critical feature; and send a signal associated with a second action different from the first action if the first image and the second image include the at least one incompatible non-critical feature.

13. The non-transitory processor-readable medium of claim 12, further comprising code to cause the processor to:

determine, in response to receiving the first image, an image identifier for the second image, the code to cause the processor to access includes code to cause the processor to access the second anomaly database using the image identifier for the second image.

14. The non-transitory processor-readable medium of claim 12, further comprising code to cause the processor to:

compare an image version identifier of the first image with an image version identifier of the second image; and send a signal associated with the first action in response to a difference between the image version identifier of the first image and the image version identifier of the second image being greater than a difference threshold.

15. The non-transitory processor-readable medium of claim 12, wherein the first action is associated with preventing the first image from being installed on the first network device.

16. The non-transitory processor-readable medium of claim 12, wherein the second action is associated with providing a warning to a user regarding the at least one incompatible non-critical feature.

17. The non-transitory processor-readable medium of claim 12, wherein the first network device is an access switch and the second network device is an aggregation switch.

18. The apparatus of claim 1, wherein the at least one incompatible non-critical feature, further includes a firewall filter, or a protocol-independent multicast (PIM) of the first image.

19. The apparatus of claim 1, wherein the at least one incompatible critical feature is a transmission protocol of the first image.

20. The apparatus of claim 1, wherein the first image includes a plurality of network software modules.

* * * * *